United States Patent [19]

Wegner

[11] Patent Number: 4,572,746

[45] Date of Patent: Feb. 25, 1986

[54] ACID REMOVAL FROM DRY CHARGE BATTERY PLATES

[75] Inventor: Paul C. Wegner, San Carlas, Calif.

[73] Assignee: Tiegel Manufacturing Co., Belmont, Calif.

[21] Appl. No.: 594,792

[22] Filed: Mar. 29, 1984

[51] Int. Cl.⁴ .............................................. B08B 7/04
[52] U.S. Cl. ........................................ 134/10; 134/12; 134/13; 134/25.4; 134/26; 134/76; 134/108; 134/109
[58] Field of Search ................... 134/10, 12, 13, 25.4, 134/26, 60, 76, 108, 109; 210/683

[56] References Cited

U.S. PATENT DOCUMENTS

| | | |
|---|---|---|
| 2,911,457 | 11/1959 | Sabatino et al. ........................ 134/2 |
| 3,979,220 | 9/1976 | Ishiyama et al. ...................... 134/10 |
| 4,024,055 | 5/1977 | Blann .................................... 210/45 |
| 4,396,435 | 2/1983 | West et al. ............................. 134/10 |
| 4,451,298 | 5/1984 | Yagishita et al. ..................... 134/10 |

Primary Examiner—Marc L. Caroff
Attorney, Agent, or Firm—Benasutti and Murray

[57] ABSTRACT

A method for preparing plates primarily intended for use in a dry charge battery includes washing pasted and formed battery plates in water flowing at a low flow rate until most, but not all, of the forming acid has been removed, and thereafter washing said plates in additional water flowing at a higher flow rate to remove residual acid; treating the additional wash water using an ion exchange bed to remove the acid and reusing the deacidified water as wash water.

12 Claims, 2 Drawing Figures

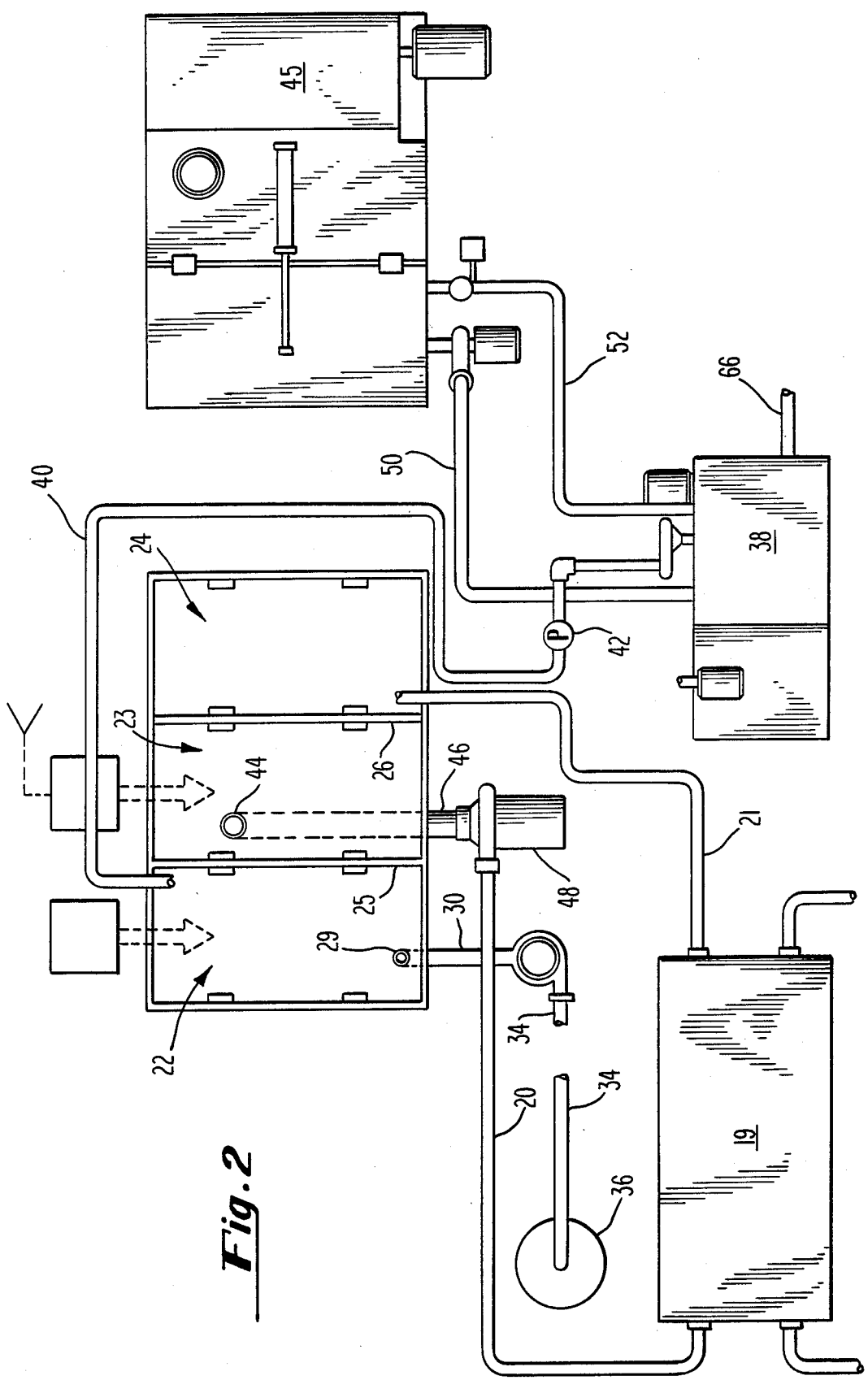

4,572,746

ACID REMOVAL FROM DRY CHARGE BATTERY PLATES

BACKGROUND OF THE INVENTION

The present invention relates generally to the manufacture of storage batteries, primarily dry charge storage batteries, and in particular, to an improved system for managing waste products produced during the manufacture of the plates of such batteries.

The manufacture of storage batteries using the so called dry charge process has been found to be desirable for a variety of reasons. The process generally involves forming the battery plates in an appropriate electrolyte solution; removing the plates from the forming acid; washing the plates in water; and then drying the plates for subsequent handling and assembly into the battery.

In the prior art, plates are first washed to remove the acid and then dried, for example in a "Tiegel 200" dry charge machine (distributed by Tiegel Manufacturing, Inc. Belmont, Calif.). Such a machine requires cooling water at a flow rate of approximately 12.5 gallons per minute. Formed wet plates are generally washed in this water for approximately 1.5 hours to yield a plate which is maintained at approximately pH 6 according to pH paper. While adequately washing the plates for subsequent processing, this results in the development of approximately 12,000 gallons of waste water per 16 hour day. This waste water is traditionally neutralized with lime; the neutralized water being decanted into a separate tank for reuse, and the resulting sludge being removed, filtered and compressed for eventual solid waste disposal. This generally results in the production of over 200 lbs. of waste material per day which, assuming a 200 day working year, results in the production of over 20 tons of waste in a given year. Since this waste qualifies as a hazardous waste material, it is expensive to dispose of. This disposal cost is added to the cost of using almost 2.5 million gallons of water per year.

Thus, the management and disposal of waste water generated in the course of manufacturing dry charge storage battery plates represents a significant cost which undesirably increases the cost of manufacturing dry charge storage batteries.

It is desirable to develop a process which is capable of managing waste by-products resulting from the manufacture of dry charge storage batteries in a cost effective manner.

SUMMARY OF THE INVENTION

It is a primary object of the present invention to provide an improved process for managing waste by-products resulting from the manufacture of dry charge storage battery plates.

It is also an object of the present invention to provide a process and apparatus for managing such waste by-products, which reduces the costs of treating such waste by-products and of disposing of the resulting waste.

It is also an object of the present invention to provide a process for managing waste by-products resulting from the manufacture of dry charge storage batteries which enables optimum recirculation and reuse of treated waste water.

It is also an object of the present invention to provide a process for handling waste by-products resulting from the manufacture of dry charge storage batteries which minimizes the amount of solid waste products produced.

These and other objects which will become apparent are achieved in accordance with the present invention by providing a two stage wash process and apparatus wherein battery plates are first washed in water at a slow flow rate until most, but not all of the acid has been removed from them. Thereafter, a second, high flow rate wash is used to remove substantially all of the remaining acid. The high flow wash process is essentially closed loop wherein the acid removed from the plates is absorbed by an ion exchange bed. When the bed is saturated with acid, it is regenerated with an alkaline material such as ammonia. The process results in plates which are appropriately washed prior to drying, while at the same time significantly reducing waste by-products.

In drying the washed plates, water received from the dryer is delivered to a cooling tower for condensation, subsequent recycling within the dryer, and in connection with the washing process. As a result, the drying phase of the dry charge process is essentially a "closed loop", eliminating the waste by-products ordinarily associated therewith.

The waste by-products associated with the washing phase of the dry charge process are materially reduced, providing significant improvement in both environmental impact and handling costs.

For further detail regarding the present invention, reference is made to the following detailed description of a preferred embodiment of the invention, taken in conjunction with the following illustrations.

BRIEF DESCRIPTION OF THE DRAWINGS

FIG. 2 is a top plan view of the apparatus illustrated in FIG. 1.

In the several views provided, like reference numerals denote similar structure.

DETAILED DESCRIPTION OF THE PREFERRED EMBODIMENT

Figure 1:
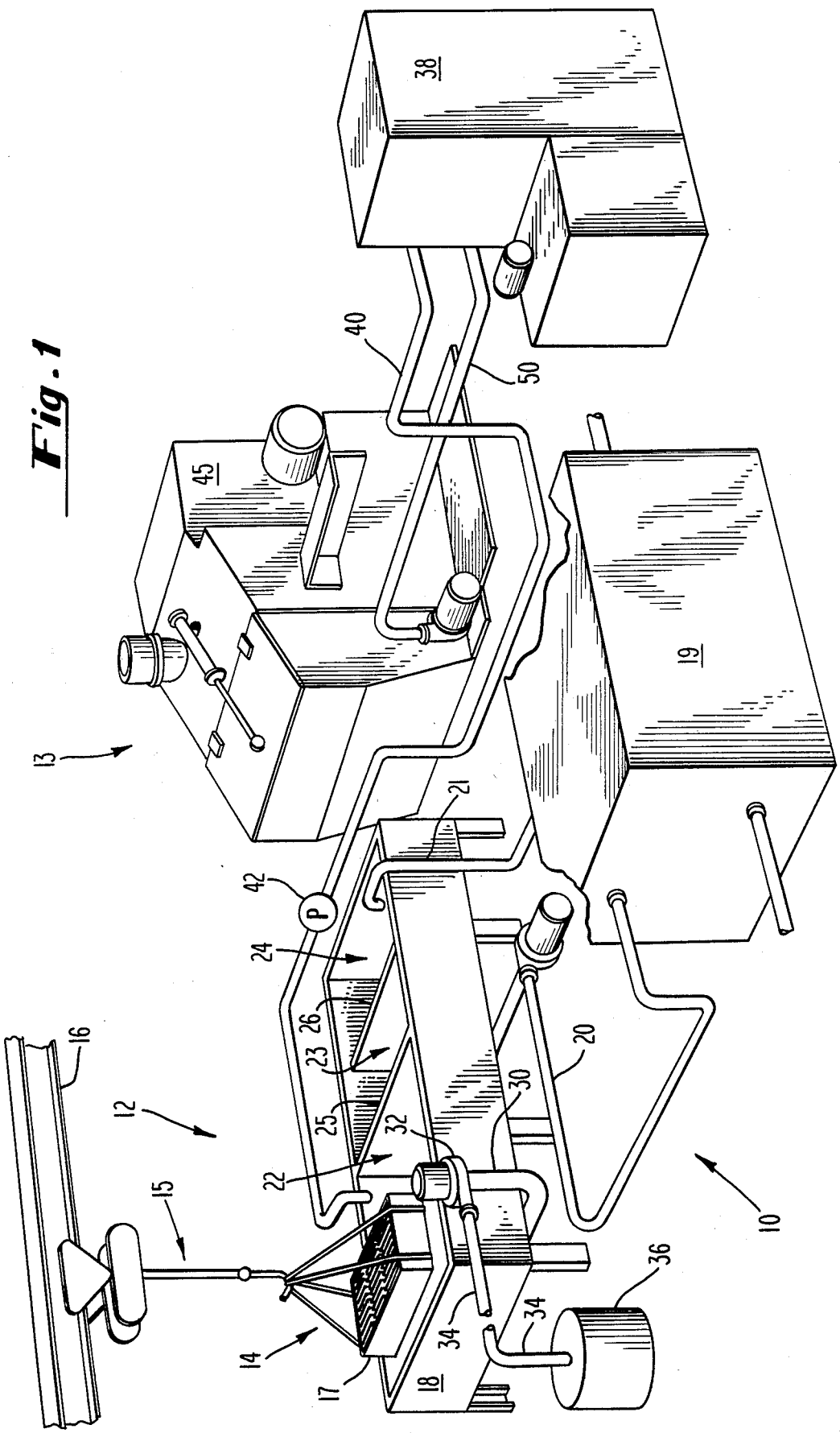
FIG. 1 is a perspective view of a preferred embodiment apparatus for use in washing and drying formed battery plates.

Although specific forms of the invention have been selected for illustration in the drawings, and the following description is drawn in specific terms for the purpose of describing these forms of the invention, this description is not intended to limit the scope of the invention which is defined in the appended claims.

FIGS. 1–2 illustrate a preferred embodiment apparatus designated generally 10 for use in connection with the manufacture of dry charge storage batteries. The apparatus 10 incorporates a washing section designated generally 12 and a drying section designated generally 13 which serially receive groups designated generally 14 of battery plates which have previously been manufactured and formed in accordance with conventional techniques. To enable movement of the battery plates between the forming apparatus (not shown), the washing section 12, the drying section 13, and subsequent handling equipment (not shown), a hoist mechanism designated generally 15 is provided which is capable of traversing a rail 16 extending over and between the various portions of the dry charge apparatus 10. The hoist mechanism 15 is provided with a basket 17 suspended from the hoist and capable of containing the groups 14.

The washing section 12 includes a tank 18, a purifier 19, and fluid lines 20, 21 enabling fluid communication between the tank 18 and purifier 19. The tank 18 is separated into at least two, and in the preferred embodiment shown, three cavities designated generally 22, 23, and 24 by partitions 25 and 26. Restricted fluid communication between adjacent cavities 23 and 24 is enabled by making the partition 26 extend upwardly to a height below the upper edge of tank 18. This optimizes uniformity in fluid flow between the cavities 23 and 24 as will be more fully described below.

The cavity 22 is provided with a drain 29 in the bottom of the tank 18 connected by a drain line 30 to pump 32 to assist in the removal and handling of fluid drawn from the cavity 22. Discharge line 34 from the pump 32 pumps the used acidic waste water from the cavity 22 to a holding tank 36. This water has a high concentration of acid, and may be used for "cutting" new acid. Cutting is where sulfuric acid is diluted with water for use in other battery processes.

Water is added to the slow flow cavity 22 of the tank 18 from the cooling tower 38 through discharge line 40. Flow of water into the tank cavity 22 is controlled by valve or metering device shown schematically at 42 in line 40.

The fluid lines 20 and 21 enable the circulation of fluid between the cavity 23 of the tank 18 and purifier 19. The cavity 23 has a drain 44 in the bottom of the tank 18 in fluid flow communication with the drain line 46 connected to the input of the pump 48 which discharges into the line 20 and thence into the purifier 19. The fluid line 21 discharges purified water from the purifier 19 into cavity 24 of the tank 18. The fluid in the cavity 24 flows over the partition 26 into the cavity 23.

The drying section 13 generally includes a dryer 45, a cooling tower 38, and fluid lines 50, 52 enabling fluid communication between the dryer and cooling tower. The dryer and cooling tower are conventional in construction.

OPERATION

The present invention is directed to a system wherein formed battery plates are serially washed in water at various flow rates. In this preferred embodiment, the tank 18 includes three cavities 22, 23 and 24 which are used in washing groups 14 of formed battery plates. The plates are first introduced into the cavity 22. Hot water at a slow flow rate from the cooling tower circulates gently from the top of the tank across the immersed plates and out of the bottom through the drain 29. The flow is adjusted so that the acid concentration of the fluid developed in the cavity 22 is preferably approximately in the range of 1 to 5% by weight. The acid concentration in the formed plates when they enter the cavity 22 is approximately 10% by weight. The acid concentration in the plates after the slow flow wash should be most preferably about in the range of 0.4 to 0.8%. The pH difference in concentrations before slow flow and after slow flow is about 1.3 or twenty times less acid in the plates; that is, 93 to 96% or most of the acid should have been removed from the plates. Thus the acid concentration of the water removed through the lines 34 and stored in tank 36 is quite high compared to the prior art method of removing acid from the plates with a wash water at a high flow rate. The prior art method produced a large volume of acidic water which was very dilute compared to the slow flow rate method. The prior art methods produced a 0.1% acid (pH 1.70) on the average in all the water from the days activities. In the method in accordance with the present invention, it is desired to have the acid concentration of the waste water from the slow flow tank be in the range of 1% to 4% or pH of about 0.7 to 0.1. It will be understood that differences in concentrations will be a function of the rate at which groups 14 of the battery plates are immersed in the cavity 22 and the flow rate.

In drying the washed battery plates, fluid collected in the dryer 45 is returned to the cooling tower 38 via the fluid line 50 and cooled. The cooling tower 38 preferably incorporates a water softener to prevent scale build up, but does not drain waste fluid to the environment. Rather, such fluid is used in connection with subsequent drying, and in supplying make-up water at a slow flow rate to the tank 18 cavity 22 through the line 40.

The fluid delivered to the cavity 24 via the fluid line 21 should generally be maintained at a pH of 4 to 7. The primary means for regulating acid concentration within the cavities 23 and 24 resides in the purifier of the make-up water. The means for regulating acid concentration in the purifier 19 is preferably an ion exchange resin bed. The resin may have an ammonium group chemically bound onto it. Such a resin is for example, DUO-LITE A-368 as manufactured by Duolite International, Inc., Diamond Shamrock, Corporation, 1100 Superior Avenue, Cleveland, Ohio. This is a macroporous weak-base anion exchange resin having, according to its technical literature, an exceptionally high operating capacity and efficiency for removal of mineral acids. Its relatively high basicity allows the absorption of weak acids having pK values below about 5.

The properties of DUOLITE A-316 according to their technical sheet are as follows:

| Matrix | Macroporous crosslinked polystyrene |
| --- | --- |
| Functional groups | Tertiary amine (90%) |
| Physical form | Beads, ivory-colored |
| Particle size | 0.3 to 1.2 mm (16–50 mesh) |
| Ionic form shipped | Free-base |
| Moisture retention capacity | 40–50% (free-base form) |
| Maximum reversible swelling | 40% (free-base to hydrochloride form) |
| Bulk density | about 700 g/l (44 lbs/cu ft) |
| Specific gravity | 1.04 Cl form |
| Exchange capacity, total | 1.7 eq/l (36 Kgr/cu ft. as $CaCO_3$) |
| Exchange capacity, operating | 1.0–1.5 eq/l (22–35 Kgr/cu ft, as $CaCO_3$) |
| Operating pH range | 0–9 |
| Maximum operating temperature | 60° C. (140° F.) free-base form 100° C. (212° F.), Cl form |
| Shipping weight | 700 g/l (44 lbs/cu ft) |

In accordance with the present invention, the used fast flow water from the tank 18, cavity 23 exits through the drain 44 and is pumped into the purifier 19 wherein the acidic water forms a salt with the ion exchange resin. The salt is bonded to the resin and can not leave the purifier. What results is water which is virtually free of all acid, which is pumped back through the line 21 into the top of the tank 18 into cavity 24 for fast washing of the plates.

The reason for two cavities, 23 and 24 in the preferred fast wash section of the tank 18 is to provide time to match the production of the dry charge machine. In operation, groups 14 of battery plates which have been appropriately formed are carried to the tank 18 by means of the hoist mechanism 15. These groups 14 of battery plates are serially introduced into the cavities 22, 23 and 24 of the tank 18, for successive washing procedures. Upon withdrawal from the cavity 24, the groups 14 of battery plates will have been thoroughly washed, and will be ready for subsequent introduction into the dryer 45; once again by means of the hoist mechanism 15. Upon drying, the groups 14 of battery plates will be removed from the dryer 45 for subsequent handling; once again using the hoist mechanism 15.

Unlike previous systems used in connection with the production of dry charge battery plates, major portions of the foregoing apparatus are essentially "closed-looped". The only interfacing necessary with the apparatus 10 is a water inlet to the cooling tower 38, for supplying water to the system. Also, purifying materials must be introduced into the purifier 19 and waste materials must be drained from the purifier 19.

In connection with this procedure, the largest acidic effluent to be accommodated is the discharge of the acid solution from the drain 29 of the cavity 22. However, since such a solution is capable of use in connection with other portions of the battery manufacturing process, such wash water is conveniently delivered from the holding tank 36 to a cutting tank (not shown) for subsequent processing either for use as electrolyte in connection with plate forming, or for use in producing the pastes which are applied to the battery plates. Accordingly, by appropriately adjusting the concentration of the effluent discharged from the drain 29, as previously indicated, the bulk of the residual fluid produced by the system of the present invention is rendered reusable, rather than requiring its treatment and disposal by conventional prior art means. The criteria in accordance with the present invention is to keep the acid concentration high and the volume low so that most and preferably all of it can be used in other manufacturing processes.

While final washing of the battery plates at high flow rate produces acidic effluent, the acid is removed by means of the purifier 19. The purifier 19 assists in managing waste by-products because the sludge delivered from the purifier will be significantly reduced from the waste by-products ordinarily delivered from previously available neutralization systems. While there is a large volume of water, it is at very low acid concentration.

For example, the following parameters should be considered in connection with the illustrative example previously provided in relation to an exemplary operation of a "Tiegel 200" dry charge apparatus. First, since the initial wash water need no longer completely remove all acid contained in the processed battery plates, the overall flow rate of the wash water may be reduced from 12.5 gallons per minute to 15 gallons per hour. Accordingly, rather than producing 12,000 gallons of waste water per day, the present apparatus will produce 240 gallons of acid having a concentration in the range of about 1 to 4%, which is suitable in both quantity and concentration for use in connection with other portions of the battery manufacturing process.

Most, that is approximately 93 to 96%, of the acid on the battery plates will be removed by this initial washing. This will leave approximately 4 to 7% of the acid for neutralization treatment in the purifier 19. However, as a result of the materially reduced quantities of acid which remain to be removed by exchange techniques, the present invention only necessitates the disposal of approximately 16 to 28 lbs. of solid waste material per day, as opposed to the production of approximately 200 lbs. of solid waste material per day of prior art methods; resulting in the production of less than 1 to 3 tons of waste material per average work year. Because of the limited amounts of ion exchange resin needed within such a system, it is generally necessary to regenerate the purifier once each day.

Thus, the foregoing apparatus serves well to satisfy each of the objectives previously set forth, by managing the waste products resulting in material reductions in waste by-products and handling costs. As further evidence of the benefits which such a system is capable of providing, the following table shows several exemplary operations of the system. The first column indicates the number of plates which may be handled in connection with each illustrative example, per hour. The second column indicates the number of pounds of neutralizing material which must be supplied to the purifier, per day, assuming a 16 hour operating day. The third column indicates the number of gallons of acid which may be drained from the tank, per hour. Lastly, the fourth column indicates the number of gallons of waste material which will be produced by the purifier, per day, again assuming a 16 hour operating day.

| Plates (per hour) | Neutralizer (lbs./day) | Acid (gal./hour) | Waste (gal./day) |
| --- | --- | --- | --- |
| 750 | 3 | 8 | 62 |
| 1500 | 6 | 15 | 125 |
| 3000 | 12 | 30 | 250 |
| 3800 | 15 | 40 | 312 |
| 4800 | 20 | 50 | 416 |
| 6000 | 24 | 60 | 500 |

The system will produce useful quantities of acid for use in connection with other phases of the battery manufacturing process, and will produce only minimal quantities of waste by-products which must be separately disposed of. Further, the amount of water which must be supplied to the system, via the inlet 66 is also kept to a minimum, thus enhancing the cost effectiveness of the system.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. For use in connection with the manufacture of storage battery plates, a process for removing acid from the plates, comprising the steps of:
    (a) washing the plates in flowing water until most of the acid has been removed from the plates at a water flow rate which is lower than that of a subsequent washing of step (b);
    (b) thereafter, removing additional acid from the battery plates by washing said plates in additional flowing water at a water flow rate producing an acid concentration in the additional wash water less than that produced in step (a) above;
    (c) discharging the additional wash water resulting from step (b) and treating said discharged water to remove the acid therefrom; and
    (d) using the treated water from step (c) for washing in at least one of said washing steps (a) and (b).

2. The process of claim 1 wherein step (c) comprises removing acid from the discharged water by ion exchange.

3. The process of claim 1 further comprising the step of washing plates in step (b) with the treated water.

4. The process of claim 1 wherein effluent resulting from washing step (a) has an acid concentration in the range of about 1 to 5% by weight.

5. The process of claim 1 wherein the washing step (b) occurs in a plurality of stages serially.

6. The process of claim 1 wherein the washing steps occur in at least three stages.

7. The process of claim 1 wherein a first washing stage develops an effluent having an acid concentration in the range of about 1 to 5% by weight, and a final washing stage develops an effluent having a pH in the range below about 4 to 7.

8. The process of claim 1 wherein after the washing steps, the plates are dried and the drying produces an effluent, and wherein the process further comprises the steps of:
    (a) cooling the effluent; and
    (b) washing the plates with the cooled effluent.

9. The process of claim 8 wherein the drying takes place in a drying means producing an effluent, and wherein the effluent from the drying means is transferred between a cooling means, the drying means and a washing means in an essentially closed loop system.

10. The process of claim 2 wherein a resin is used to effectuate the ion exchange.

11. The process of claim 8 wherein the cooled effluent is used as wash water in step (a).

12. For use in connection with the manufacture of storage battery plates, a process for removing acid from the battery plates and managing waste water produced in washing, comprising the steps of:
    (a) washing the battery plates in flowing water until most of the acid has been removed from the battery plates at a water flow rate which is lower than that of a subsequent washing of step (c);
    (b) collecting the wash water of step (a) for reuse;
    (c) removing additional acid from the battery plates by washing said plates in additional flowing water;
    (d) treating the additional water resulting from step (c) to remove the acid therefrom; and
    (e) recirculating this treated water from step (d) in the process in a closed loop.

* * * * *